Aug. 2, 1932.  C. F. GODDARD  1,870,046
AUTOMOBILE STORAGE ELEVATOR
Filed Sept. 18, 1929   8 Sheets-Sheet 3
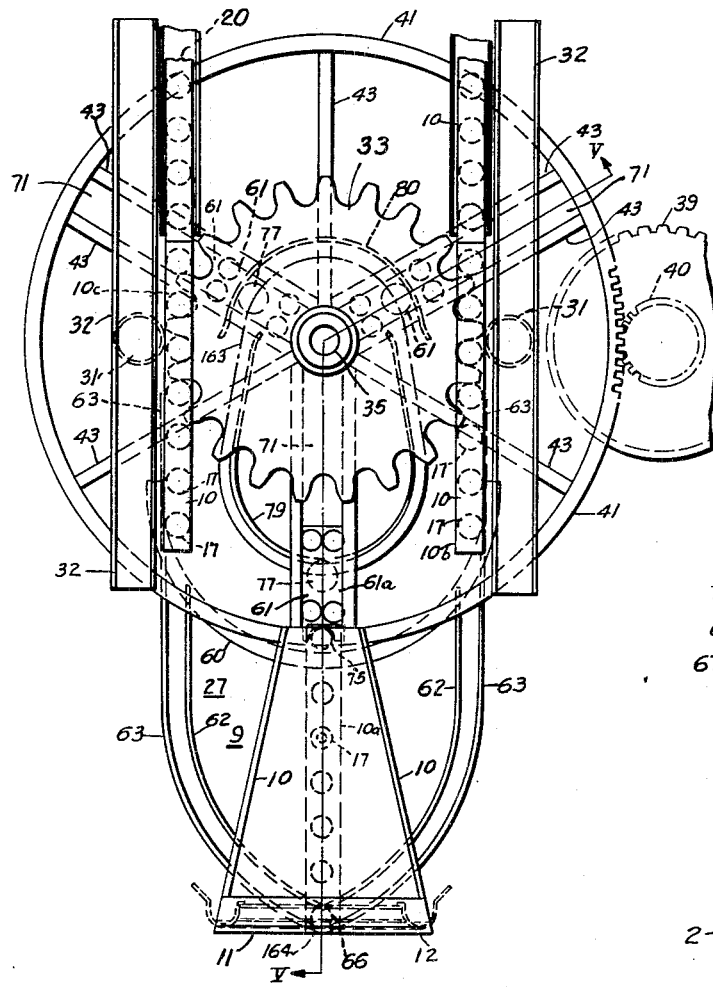
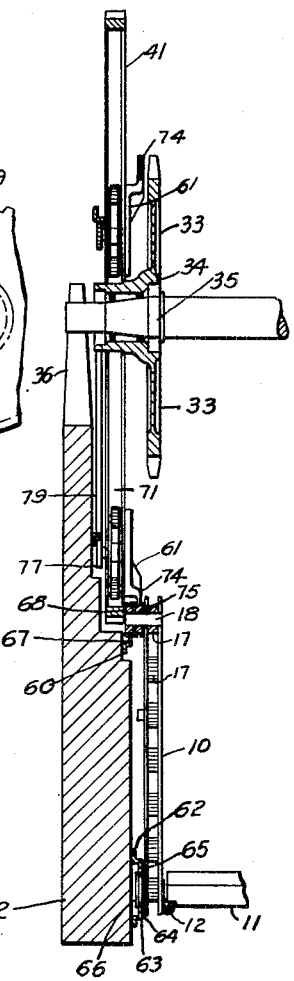
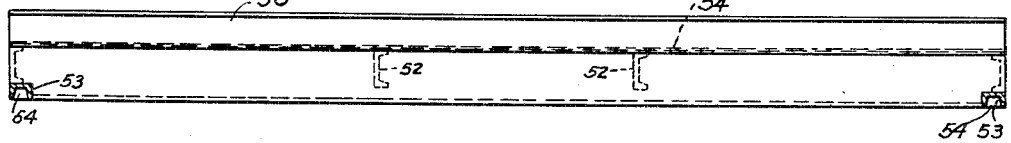
INVENTOR
Charles F. Goddard.
BY
Wesley G. Carr
ATTORNEY

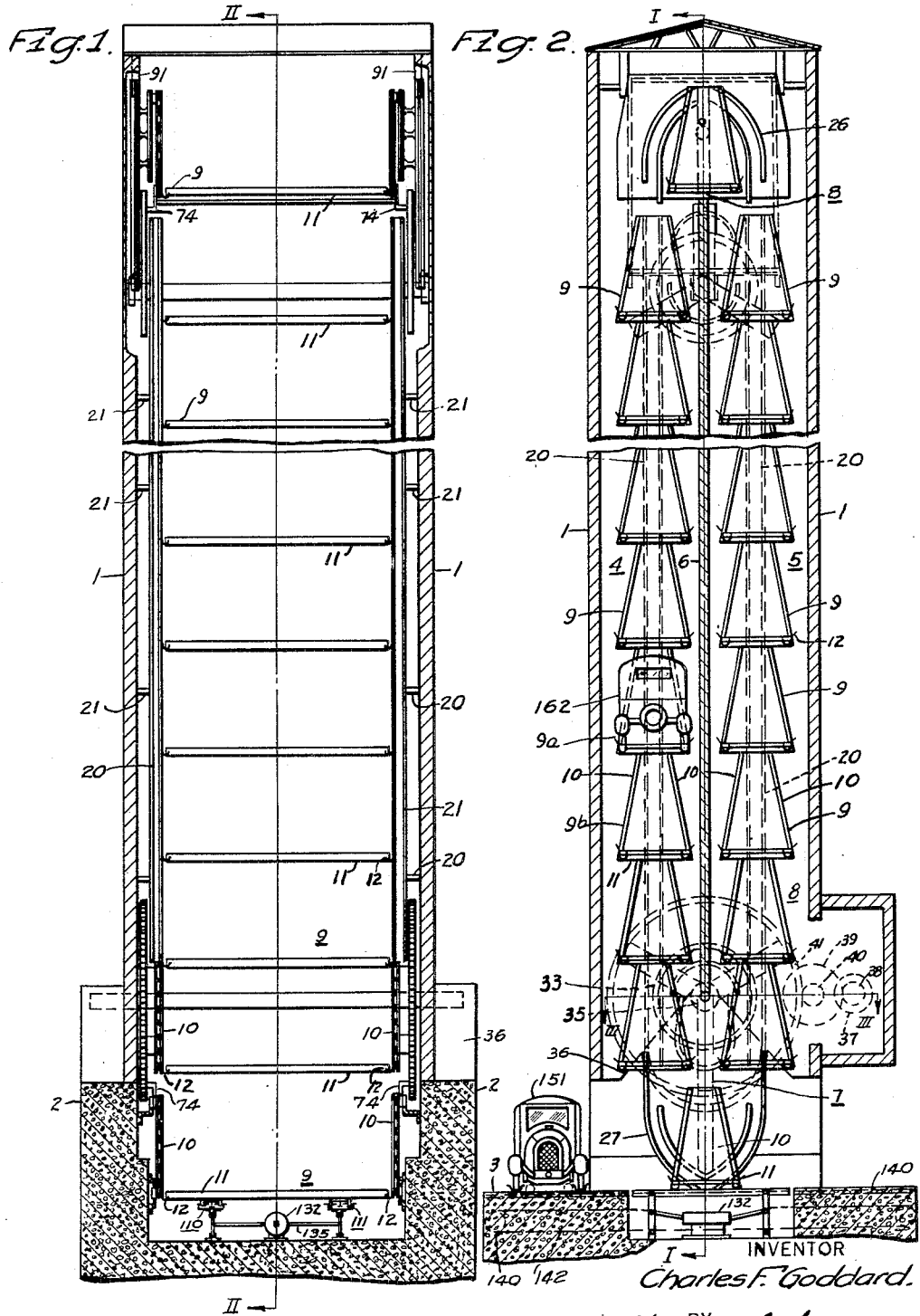

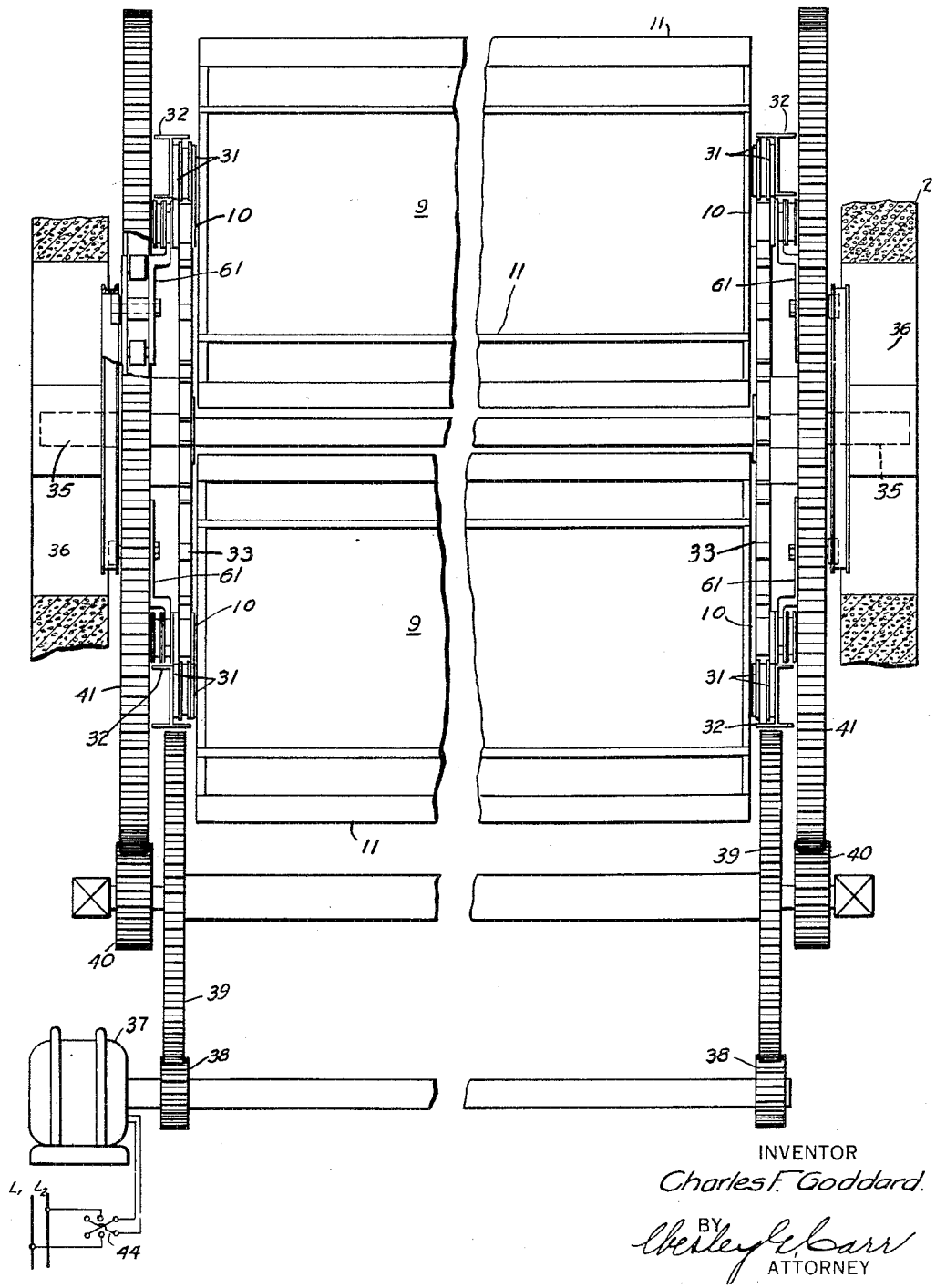

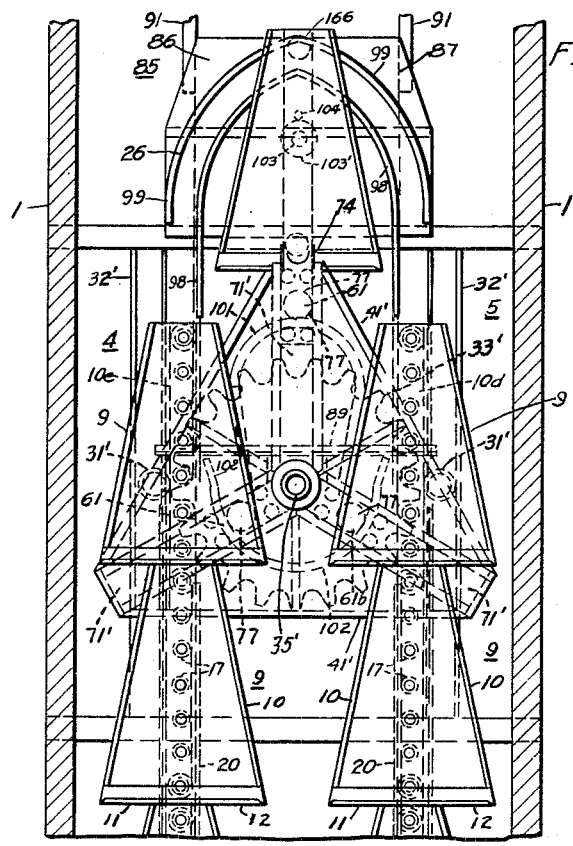

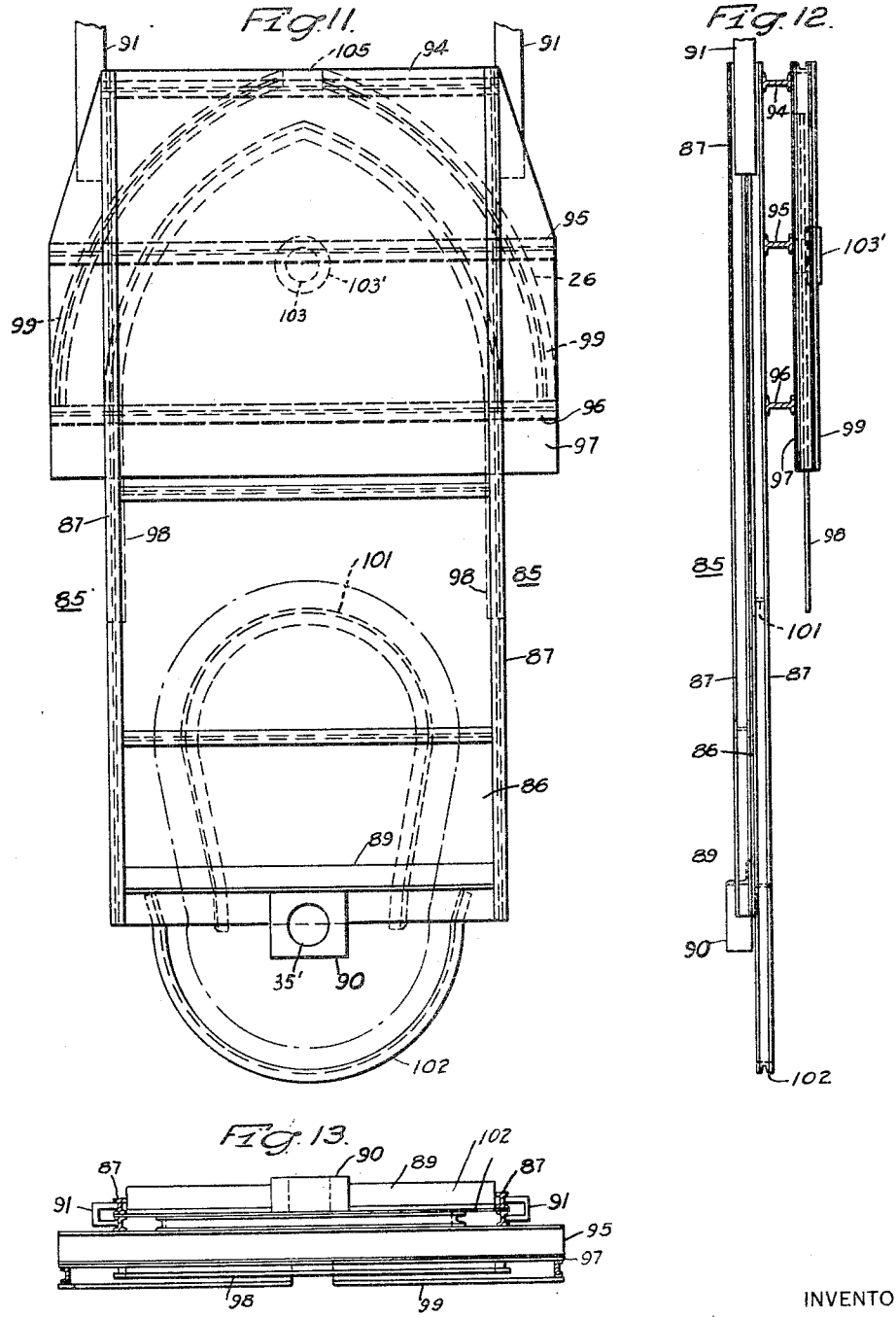

Aug. 2, 1932.  C. F. GODDARD  1,870,046
AUTOMOBILE STORAGE ELEVATOR
Filed Sept. 18, 1929    8 Sheets-Sheet 6
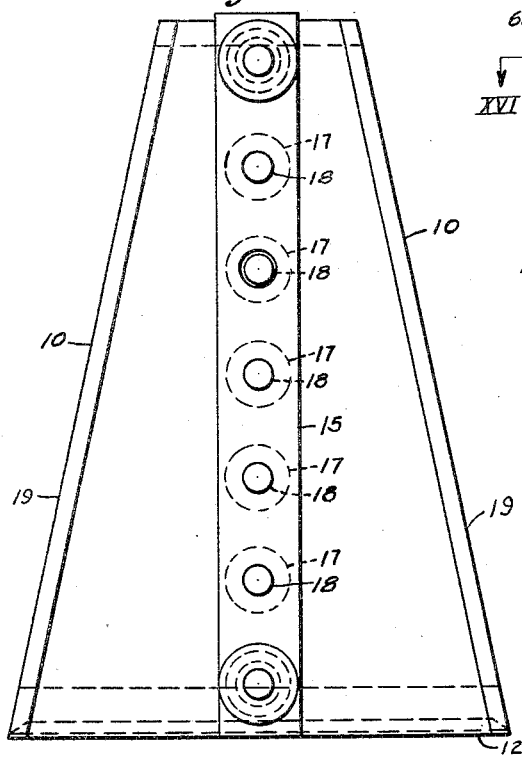
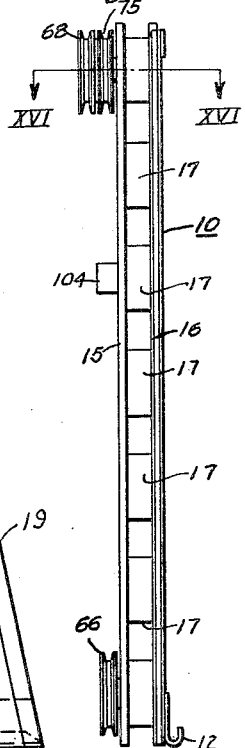
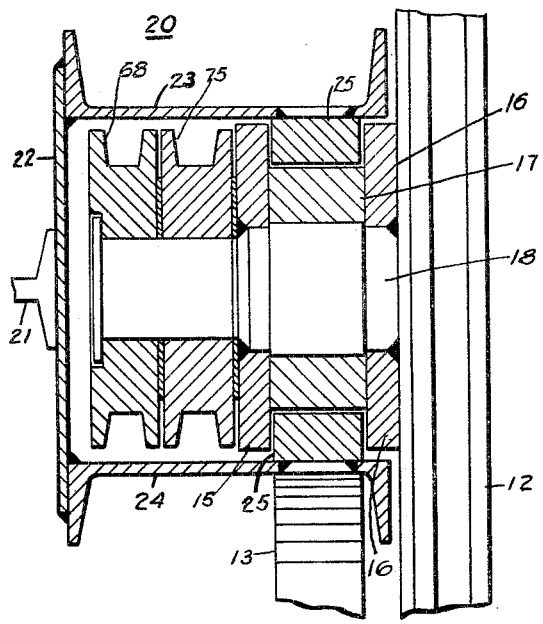
INVENTOR
Charles F. Goddard.
BY
ATTORNEY Aug. 2, 1932.  C. F. GODDARD  1,870,046
AUTOMOBILE STORAGE ELEVATOR
Filed Sept. 18, 1929    8 Sheets-Sheet 7
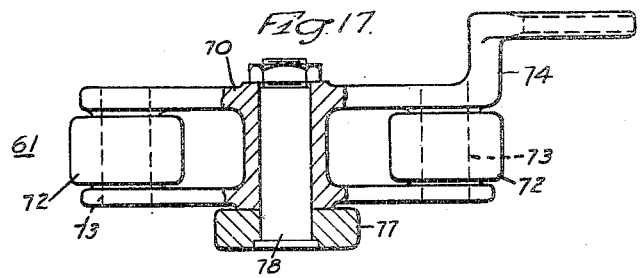
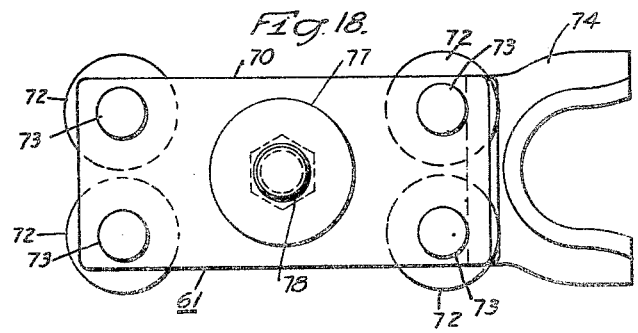
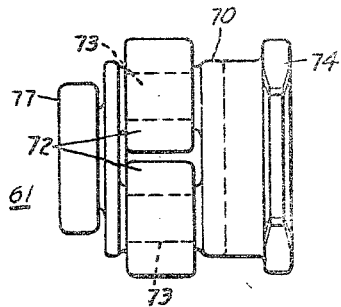
INVENTOR
Charles F. Goddard.
BY
ATTORNEY Aug. 2, 1932.   C. F. GODDARD   1,870,046
AUTOMOBILE STORAGE ELEVATOR
Filed Sept. 18, 1929   8 Sheets-Sheet 8
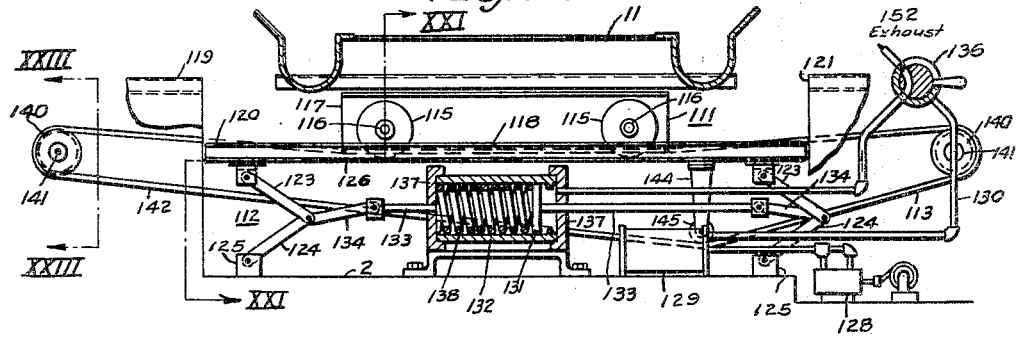
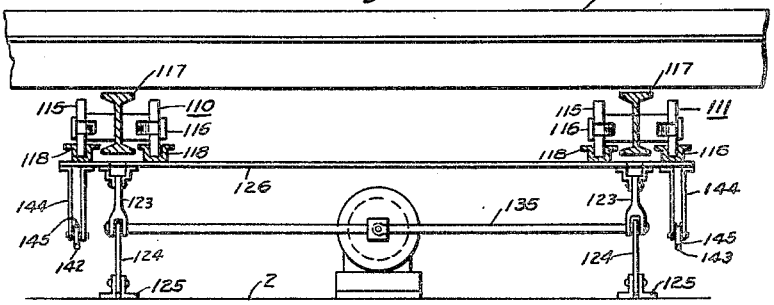
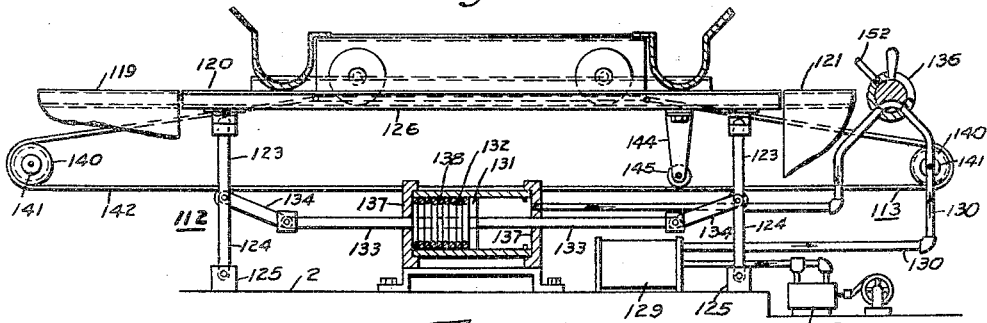
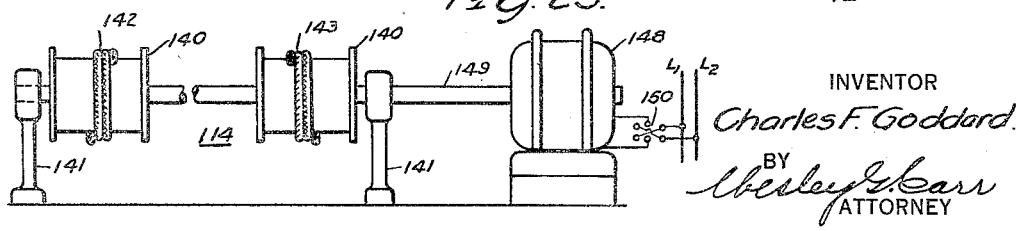
INVENTOR
Charles F. Goddard.
BY
Wesley G. Carr
ATTORNEY Patented Aug. 2, 1932

1,870,046

UNITED STATES PATENT OFFICE

CHARLES F. GODDARD, OF WILKINSBURG, PENNSYLVANIA, ASSIGNOR TO WESTINGHOUSE ELECTRIC & MANUFACTURING COMPANY, A CORPORATION OF PENNSYLVANIA

AUTOMOBILE STORAGE ELEVATOR

Application filed September 18, 1929. Serial No. 393,414.

My invention relates to elevators in which the individual cages or receptacles move in a continuous path through a pair of adjacent vertical columns connected at their respective ends and more particularly to such elevators as are provided with means for transferring the individual cages or receptacles from one vertical path of movement to another, at a speed greater than the speed of the cages through the vertical paths of movement.

While my invention will be described particularly with reference to its applications to elevators for parking and storing automobiles which are commonly known as garage or automobile storage elevators, I am fully aware of the fact that the principles which are embodied in my invention are applicable to any form of conveyor service.

The problem of automobile parking in large cities, particularly in congested downtown areas, has long been recognized, and, as a solution therefor, various types of automobile-storage devices have been proposed.

The proposed types of storage devices of this character may be divided into two classes, viz., the endless-chain type and the box-conveyor type.

The endless-chain type is illustrated in the copending application of H. D. James, Serial No. 265,011, filed March 27, 1928, and assigned to the Westinghouse Electric & Manufacturing Company, and comprises a housing or supporting structure defining two adjacent vertically extending hollow columns interconnected at the upper and lower ends thereof and in which endless chains support and move the load receptacles circuitously through the columns. This type has the advantage of permitting continuous motion of the load receptacles through both the vertical and the horizontal portions of their travel but has the disadvantages that the weight of the entire conveyor structure is supported in the upper part of the supporting structure and that the load receptacles must be spaced apart on the chains to allow clearance as the receptacles are transferred from vertical to horizontal motions and vice versa.

The box-conveyor type is illustrated in my copending application, Serial No. 141,159, filed October 12, 1926, and assigned to Westinghouse Electric & Manufacturing Company, and comprises a supporting structure forming two vertical columns interconnected at their respective ends but, in this case, the load receptacles are made in the form of boxes supported one upon another and all supported upon a motive power device at the bottoms of the columns which operates to move the stacks of boxes vertically. With this type of structure, the top box in one column and the lowermost box in the other column are transferred to opposite columns during a pause in the vertical motion. This intermittent and alternating vertical and horizontal movement is time consuming, which disadvantage is but partially compensated by the fact that there is no lost space between adjacent cages or boxes.

One object of my invention, therefore, is to provide a storage system which combines, in one structure, the advantages of the continuous motion that is secured in the endless-chain type with the advantages of the close spacing, the self supporting of the receptacles and the supporting of the entire conveyor system at the lower part of the device that are secured in the box-conveyor type.

Another object of my invention is to provide an automobile-storage elevator in which the efficiency of utilization of space or volume in a supporting structure or building is obtained—that is, an automobile-storage elevator in which the maximum amount of space or volume in a supporting structure or building is utilized for storage purposes.

Another object of my invention is to provide a device for transferring successive platforms or cages from one vertical column to another at a speed greater than the normal speed of travel of the cages through the vertical columns. By this means, successive platforms or cages, though closely spaced, are permitted to clear each other while being transferred from one vertical column to the other, the entire system of platforms or cages being in continuous motion.

A further object of my invention is to provide a means of support for the moving system of cages whereby practically the entire weight of the system is carried on a firm foundation at the bottom of a supporting structure.

It is also an object of my invention to provide a structure for the support of the system of moving cages or receptacles which automatically adjusts itself to any misalignment of parts, especially misalignment of parts due to expansion or contraction caused by temperature changes or by wear.

Other objects of my invention will, in part, be obvious and will, in part, appear hereinafter.

For an illustration of one of the various forms my invention may take, reference is to be had to the accompanying drawings, in which:

Figure 1 is a view, mainly in front elevation but partly in section, of an automobile-storage elevator embodying my invention;

Fig. 2 is a view, in section, taken on the line II—II in Fig. 1;

Fig. 3 is an enlarged view, in section, taken on the line III—III of Fig. 2;

Fig. 4 is an enlarged view, in side elevation, illustrating, in detail, the mechanism for guiding and rapidly transferring the cages at the lower end of the shaft, as utilized in the elevator shown in Figs. 1, 2 and 3;

Fig. 5 is a view, in section, taken on line V—V of Fig. 4;

Fig. 6 is an enlarged view, in side elevation, of one of the automobile-storage platforms which are illustrated as the floors of the automobile cages in the preceding figures;

Fig. 7 is a view, in end elevation, of the platform shown in Fig. 6;

Fig. 8 is an enlarged view, in side elevation, illustrating in detail the mechanism for guiding and rapidly transferring the cages at the top of the elevator shaft;

Fig. 9 is a view, in side elevation, of the structure shown in Fig. 8;

Fig. 10 is an enlarged bottom plan view of the structure shown in Fig. 8;

Fig. 11 shows an enlarged view, in side elevation, illustrating in detail the upper guiding assembly included in Fig. 8 and the manner in which it is supported upon the upper cages;

Fig. 12 is a view, in side elevation, of the guiding structure shown in Fig. 11;

Fig. 13 is a bottom plan view of the structure shown in Fig. 11;

Fig. 14 is a detail view, in side elevation, of one of the supporting racks that constitute the side members of the automobile cages;

Fig. 15 is a view, in side elevation, of the cage rack shown in Fig. 14;

Fig. 16 is an enlarged view, in section, taken on the line XVI—XVI of Fig. 15 with additional illustrative matter showing how the rack is disposed in vertical guide and support in which it moves up and down, together with a portion of the sprocket wheel that raises and lowers it in the shaft;

Fig. 17 is a view, in side elevation, its central portion being broken away, of one of the crossheads or riders which are mounted in grooves in the upper and in the lower transfer mechanisms to pick up the cage racks and transfer them from one column to the other column;

Fig. 18 is a bottom plan view of the crosshead shown in Fig. 17;

Fig. 19 is a view, in end elevation, of the crosshead shown in Fig. 17;

Fig. 20 is a view, mainly in end elevation but partly in section, of a suitable device for loading and unloading the elevator, with the device in its normal retracted position with reference to the lowermost platform in the elevator;

Fig. 21 is a view, in front elevation, of the loading and unloading device shown in Fig. 20, taken on line XXI of Fig. 20;

Fig. 22 is a view similar to that of Fig. 20 but showing the loading and unloading device in its upwardly extended position in which the automobile platform to be removed from the elevator is raised from the supporting hooks on the cage racks of the elevator, and Fig. 23 is a view, taken on the line XXIII—XXIII of Fig. 20, illustrating a driving motor and associated apparatus for moving laterally the carriages upon which the automobile-supporting platforms are carried while they are being loaded upon, or unloaded from, the elevator.

Referring to Figs. 1 and 2, I have illustrated an automobile-storage structure comprising a suitable housing 1 supported upon a foundation 2.

At the lowermost portion of the housing structure, I have illustrated a passageway through one of the outerwalls of the housing 1 to provide a loading passage communicating with a driveway 3 through which automobiles to be stored within the housing may be loaded upon, and unloaded from, the elevator.

The housing 1 is divided into two vertically extending columns 4 and 5 by a fire-proof partition wall 6 that extends substantially throughout the entire height of the housing structure. The partition wall 6 extends from a point just above the bottom of the structure 1 to, and terminates at a point just below, the top of the structure 1, thereby leaving communicating passageways 7 and 8 respectively at the upper ends and at the lower ends of the two hollow columns.

In the circuitous pathway provided by the hollow columns 4 and 5 and the passageways 7 and 8, are disposed a plurality of cages 9 upon which automobiles or other devices may be carried or stored.

While any suitable cage may be employed I have illustrated each of the cages 9 as comprising a pair of side members or racks 10 and an automobile-supporting platform 11 that is removably mounted thereon by means of hook-shaped members 12. The hook-shaped members 12 are secured to the lower ends of the side racks 10 and extend under the outer ends of the platform. The racks 10 are interchangeable, and the platform 11 may be suspended upon the hook-shaped members of any two racks that are in position to receive it.

As shown in Figs. 14, 15 and 16, each of the side racks 10 comprises a pair of vertically disposed plates 15 and 16 between which are placed, at equal distances apart, a plurality of rollers 17 that are rotatably mounted on a plurality of pins 18. The ends of the pins 18 are riveted or welded into the side plates 15 and 16, thus serving to hold the plates rigidly together, as well as providing axles for the rollers. Attached to the upper and to the lower portions of the plate 16 is a framework 19 that is arranged to strengthen the rack 10 and assist in retaining, in position upon it, the hook-shaped member 12 for engaging the platform 11.

In order that the racks 10 may be retained in their vertical positions in the hatchways, they are disposed in vertical guideways 20 which are attached to the side walls of the housing 1 by a plurality of positioning members 21. The guideways 20 in the same end of the two columns 4 and 5 are connected below and above the separating partition 6 by curved guiding tracks 26 and 27, respectively, which serve to control the course of the racks 10 when they are being transferred from one column to another, as will be more fully described hereinafter.

Each of the guideways 20 comprises a base plate 22 and side members 23 and 24 that are welded to the base plate to provide a channel for the racks 10.

To assist in retaining the racks 10 in their vertical positions in the channels or guideways 20, each guideway is provided with a pair of guide strips 25 that are welded to the side members 23 and 24 in such position as to extend inwardly between the outer edges of the rack plates 15 and 16 to such positions that they may engage the outer peripheries of the rollers 17. With this construction, the strips 25 will bear against the inner sides of the plates 15 and 16, thus preventing the racks from falling out of the guideways.

Instead of the cages 9 being suspended in each of the hollow columns 4 and 5, as is usual in elevator construction, the bottom cages in the columns are supported upon a pair of large sprocket wheels 33 that are disposed near the bottom of the shaft, and the other cages are stacked one on top of another, on top of the bottom cages. Thus, the whole set of cages in each column is supported from the bottom instead of being suspended from the top of the elevator housing.

By referring particularly to Fig. 4, it will be seen that the racks 10 are seated one on top of another and that the teeth of the sprocket wheels 33 engage or mesh, through cut-away places in the guides 20, with the rollers 17 in the bottom racks 10 and thus support the stack of racks in their vertical positions in the guideways. In other words, the weight of the racks 10 and the platforms 11 carried thereby are supported upon the teeth of the sprocket wheels 33.

In order to retain the racks 10 in mesh with the sprocket wheels 33, in spite of the large forces exerted between them, I have placed, adjacent to each meshing point, a wheel or rotatable disk 31. The wheels 31 are mounted on I beams 32 that are attached to the walls of the building 1 and are so positioned that they bear against the sides of the racks at points that are opposite to the meshing points, thereby holding the racks firmly in mesh with the teeth of the sprocket wheels as they pass up or down.

When the sprocket wheels 33 are rotated, in a counter-clockwise direction, for instance, all the racks 10 and the platforms 11 in the right-hand column 5 will be raised, while all the racks and platforms in the left-hand column will be lowered.

The sprocket wheels 33 are rotatably mounted, by means of roller bearings 34 (see Fig. 5), upon a nonrotatable axle 35, the outer ends of which are seated in, and supported upon, a pair of pedestals 36. The pedestals 36 are directly supported upon the concrete foundation 2 in order that they may be able to carry the weight of all the cages and the loads disposed thereon.

Any suitable means may be provided for rotating the sprocket wheels 33, such as an electric motor 37 which may be connected to the sprocket wheels through a suitable set of speed-reducing pinions and gears 38, 39, 40 and 41. As shown, the rims of the large gear wheels 41 are mounted upon a plurality of spokes 43, the inner ends of which are secured to the hubs of the sprocket wheels 33, thereby providing good driving connections between the gear wheels and the sprocket wheel.

The motor 37 may be connected to any suitable source of electrical power by a reversing switch 44 which should be located at some suitable point to permit an attendant to control the operation and the direction of rotation of the motor in operating the elevator.

Each of the platforms 11 (see Figs. 6 and 7) comprises a pair of heavy trough-shaped members 50 and 51 that are adapted to receive and guide the wheels of the automobiles as they are run upon the platforms. The trough members 50 and 51 are connected by a plurality of channels 52 that extend across the platform and may be welded to the trough members.

Underneath the ends of the trough members 50 and 51, at each end of the platform, is disposed an inverted channel member 53 which is welded, or otherwise secured, to the trough members. The channel members 53 serve not only to strengthen and support the trough members but also to engage and be supported by the hook-shaped members 12 on the lower ends of the racks 10, when the platforms are placed in position on the racks.

The outer ends of the channel members 53 are closed at their ends by plugs 54 that are welded or secured thereto in any suitable manner to cause the channels to fit down over the hook-shaped members 12 on the racks 10 and thereby interlock the platforms with the racks and prevent them from sliding sideways. Therefore, when the platforms 11 are removed from the racks 10, it is necessary to first lift them above the hooks 12, and then move them sideways out of the elevator.

Any suitable sheet material 54' may be placed on the cross members 52 to constitute a flooring for the platform and prevent grease or other material from falling through between the trough members 50 and 51 upon the lower cars or platforms.

In garage elevators of the character illustrated in the drawings, it is necessary, in order to move the cages 9 through the circuitous path formed by the channels 4 and 5 and the passageways 7 and 8, to provide some means whereby the top cage in one column and the lowermost cage in the other column may be transferred to opposite columns.

For instance, if the lowermost cage in the left-hand column 4 (see Fig. 2) is transferred to the right-hand column 5, the topmost car in column 5 will be moved upwardly and it must, therefore, be transferred to the top of the left-hand column 4.

Furthermore, in order to stack as many cages as possible in each column and yet move them quickly and efficiently, it is necessary to provide for transferring the cages, as they reach the top and bottom, without interfering with, or stopping, the movement of the cages in the columns.

In Figs. 4 and 5, I have illustrated, in detail, a means for rapidly transferring the cages at the bottom of the elevator, comprising a pair of transfer tracks 27 and 60 for guiding the racks 10 from one column to the other and a plurality of cross-heads or riders 61 for engaging the racks and forcing them along the transfer tracks from the one column to the other at a speed that is faster than their speed in the vertical columns.

Inasmuch as the transfer tracks and the riders for moving the racks at each end of the cages are similar to each other, only those connected with the sprocket wheel at one end will be described.

The transfer track 27 (see Fig. 4) comprises a pair of curved members 62 and 63 which are firmly secured to the wall 1 and which have inner offset portions 64 and 65 that constitute a holding and guiding track for a grooved wheel 66 on the lower end of the rack 10. The grooved wheel 66 is rotatably mounted on an extended portion of the pin 18 at the bottom of the rack 10 and, therefore, cooperates with the track 61 to maintain the rack in its vertical position and to guide its bottom portion from the one to the other column.

The transfer track 60 is also firmly secured to the wall 1 above the track 27 and is provided with an offset portion 67 disposed to engage a grooved wheel 68 on the upper portion of the rack 10. The grooved wheel 68 is rotatably mounted on an extended portion of the pin 18 at the upper end of the rack 10 and thus cooperates with the track 60 to maintain the rack in its vertical position and, at the same time, guide the upper portion of the rack from the one to the other column.

As shown in Figs. 17, 18 and 19, each of the cross-heads or riders 61 for forcing the racks 10 along the transfer tracks 27 and 60 from the one to the other column comprises an elongated body member 70, preferably a casting, that is adapted to be seated in a radial slot 71 in the large gear wheel 41. A plurality of bearing rollers 72 are mounted on pins 73 in the body member 70 of the rider for the purpose of reducing the friction between the walls of the slot 71 and the rider. A portion of the right-hand end of the rider 61 is extended and offset from the body 70 of the rider to constitute a fork 74 that is adapted to engage a grooved wheel or pulley 75 on the upper part of the rack 10 and apply force thereto to move the rack along the tracks 27 and 60.

The slot 71 in which the rider 61 travels extends radially from the hub to the rim of the gear wheel 41 and it may be readily formed by disposing two of the spokes 43 in parallel relation to each other and at such a distance apart that they constitute a path or track in which the rider may travel back and forth from the hub to the rim in a radial direction. The position of the slot with reference to the teeth on the sprocket wheel 33 is such that the fork 74 will register with one of the sprocket notches when the rider 61 is in its retracted position near the hub of the gear wheel 41 so that the rider will pick up or engage the rack just as it leaves the sprocket wheel.

Inasmuch as the rider fork 74 engages one side of the grooved wheel 75 while the track 60 engages the opposite side of the grooved wheel 68 on the upper part of the rack 10 after the rack leaves the sprocket wheel, the rack will be held firmly in engagement with the rider fork during the transfer period.

The means for moving the rider 61 radially outward as the sprocket wheel 33 and the gear wheel 41 rotate through the lower half of their revolution so as to effect the transfer of the rack 10, comprises a roller 77 rotatably mounted on a stub shaft 78 on the rider and a cam-shaped track 79 that is mounted in a fixed position on the wall of the structure 1. The track 79 is disposed below the axis of the gear wheel 41 in such position that the roller 77 on the rider 61 will impinge against the track as the gear wheel rotates and thus cause the rider and the fork 74 thereon to be forced radially outward into driving engagement with the rack 10.

A cooperating track 80 is disposed on the wall 1 above the axis of the gear wheel 41 in such position as to engage the roller 77 to keep the rider in its retracted position during the upper part of its travel around the axis of the gear wheel.

With the arrangement of the roller 77 and the tracks 79 and 80 just described, the combination of the movement caused by the rotation of the gear wheel and the radial movement caused by the roller 77 impinging against the cam track 79, causes the rider to move radially outward as it rotates with the wheel and to thereby push the rack 10 around the transfer tracks 27 and 60 at a greater speed than the speed caused solely by the rotation of the gear wheel.

It should be noted that the curvatures of the transfer tracks 27 and 60 and the roller cam track 79 are so designed as to cause the speed of the moving rack 10 to increase as it descends from the sprocket wheel to the lowermost point and then to decrease as it ascends in the next column until it just equals the speed of the upper racks as it is picked up by the teeth on the sprocket wheel. Thus, as the transferred racks 10 come up under the racks that are being supported by the teeth of the sprocket wheels 33, they will engage the upper racks and push them on upwardly without jolting or jarring them.

While the number of teeth on each of the sprocket wheels 33 and the number of rollers 17 in each rack may be designed to suit the size of the racks, in the present instance, I have illustrated each sprocket wheel as provided with twenty-one teeth and each rack as having seven rollers. Therefore, the sprocket wheels, during each revolution, will engage three pairs of racks, thus causing the racks to follow each other in correct order and move into their proper position at the right time during the transferring operation.

In using twenty-one teeth in the sprocket wheels and seven rollers on the racks, it is necessary, to employ three of the riders 61 on each sprocket wheel. As shown, the slots 71 and the riders therein are spaced 120° apart on the sprocket wheel so that each rack, as it moves into position to be transferred, will be picked up by a rider and pushed along the transfer tracks 27 and 60.

The mechanism for transferring the cages at the top of the elevator is similar in construction and operation to the mechanism just described for transferring the cages at the bottom of the elevator. However, while the lower transfer mechanism supports and drives the racks 10, the whole upper transfer mechanism is constructed as a unit which rests or floats on the upper racks and is operated by the relative movement of the columns of racks as they are raised and lowered. The floating of the upper transfer mechanism on the racks also permits that mechanism to adapt its position to any change in the height of the racks by reason of wear or changes in temperature, etc.

The upper transfer mechanism indicated in Fig. 1, one side of which is set forth in detail in Figs. 8, 9, 10, 11, 12 and 13, comprises a pair of sprocket wheels 33' that are disposed between the top racks 10 in the columns 4 and 5. The sprocket wheels mesh with the rollers 17 in the racks and are supported thereby. An axle 35' that is firmly mounted in, and is supported by, the sprocket wheels 33' serves to connect them at their axes for the purpose of keeping them correctly spaced apart and causing them to act as a unit.

Upon the outer ends of the axle 35' are mounted a pair of rack-guiding frames 85, one of which is illustrated in detail in Figs. 11, 12 and 13. Inasmuch as both guiding frames are alike, a description of only one of them will be given.

The frame 85 comprises a central plate 86 upon the vertical edges of which are secured a plurality of I-beams 87 and upon the lower portion of which is horizontally disposed an angle iron 89, which serve to stiffen and strengthen the frame. The frame 85 is secured to the axles 35' by means of a bearing block 90 which is disposed underneath the angle iron 89 to permit the axle to rotate with the sprocket wheels 33' without disturbing the position of the frame.

In order to maintain the guiding-frames 85 in a vertical position on the axle 35', a pair of channel members 91 are rigidly secured to the roof of the wall structure 1 in such position as to depend downwardly and slidably engage the grooved sides of the I-beams 87 on each of the frames. As shown, the channel members 91 extend down along the side members 87, thereby keeping the frames in vertical positions so that they cannot rotate on the axle 35' but, at the same time, permitting them to move up or down so that they may accommodate themselves to any changes in the total height of the racks. Thus, if the total height of the racks increases or decreases, by reason of changes in temperature, etc., the upper transfer structure will always be at the correct height for transferring the uppermost cages.

Mounted in a transverse position on the upper portion of the frame 85 are a plurality of I-beams 94, 95 and 96 that serve to support a plate 97 upon which the rack guiding track 26 is mounted. The guiding track 26 comprises two curved flanged rails 98 and 99. The flange of the rail 98 is disposed to engage the groove of the wheel 68, and the flange of the rail 99 is disposed to engage the groove in the wheel 75 on the upper end of the rack. Thus, when the rack is moved upwardly, the rails 98 and 99 engage the opposite sides of the wheels 68 and 75 and guide the upper end of the rack while it is being transferred from the one to the other column.

The means for lifting the uppermost racks from the top of the stacks of racks and pushing them along the guiding track 26 from the one to the other column is similar to the means employed in the lower transfer mechanism for moving the racks along the transfer tracks 27 and comprises a pair of triangular-shaped members 41' and a plurality of the riders 61 that cooperate therewith to effect the transfer of the racks.

The triangular members 41' are fixedly mounted on the hubs of the sprocket wheels 33' so that they will rotate with the sprocket wheels when the latter are operated by the relative up and down movements of the racks.

The riders 61 in the upper mechanism are disposed in radial slots 71' in the triangular members 41' and, therefore, are carried around with the triangular members when they are rotated.

In order that the forks 74 on the outer ends of the riders 61 in the slots 71' may be caused to engage the grooved wheels 66 on the lower ends of the upper racks and push the racks upwardly and along the transfer tracks 27, a cam-shaped track 101 is mounted above the axis of the sprocket wheel 33' on the frame 85 in position to engage the roller 77 on the rider as the rider is carried through the upper half of its cycle by the triangular member 41'. The curvature of the track 101 is such that its engagement with the roller 77 causes the rider to move radially outward in the slot 71' as the triangular member rotates through the upper half of its revolution. Thus, the combination of the rotative and radial movements of the rider causes the fork 74 on the rider to engage the grooved wheel 66 on the lower end of the rack and push the rack along the transfer track 27 from the one to the other column.

A semi-circular track 102 is mounted below the axis of the sprocket wheel 33' on the frame 85 to engage the opposite side of the roller 77 as the rider completes the transfer of the rack and thereby retain the rider 61 in its retracted position near the axis of the sprocket wheel during the lower half of its cycle of movement.

Welded to the central portion of the plate 97 is a projecting pin 103 on which is rotatably mounted a roller 103' that is disposed to be engaged by a lug 104 on the rack 10 as the rack reaches the midway point in its transfer movement. The lug 104 may be an extension of one of the pins 18. The impinging of the lug 104 on the roller 103' will retard the movement of the upper part of the rack as roller 68 reaches the peak of track 98 and prevents the upper end of the rack 10 from tilting downwardly before the rider 61 has passed the dead-center line and starts its downward motion.

Such tilting of the rack 10 into the descending portion of tracks 98 and 99 before the rider passed the dead-center line would cause binding of the top of rack 10 against track 99 which is effectively obviated by the action of roller 103' and pin 104, preventing the tilting of the rack into such binding position.

The movement of pin 104 over roller 103' may cause the rack 10 to bind in the tracks 98 and 99, as the peak of the tracks is reached. To prevent such binding, I have illustrated the uppermost portion of track 99 as having a cut-out part 105 allowing the roller 75 to move freely upwardly as the pin 104 passes over the roller 103.

By referring to Fig. 8, it will be noted that a plurality of I-beams 32' are secured to the walls at the top of the building 1 and provided with rollers 31' that are disposed to bear against the sides of the racks at points that are opposite to the meshing points of the sprocket wheels 33' with the racks to thereby hold the racks firmly in mesh with the teeth of the sprocket wheels, in a manner similar to that set forth in the lower transfer mechanism.

While any suitable means may be employed for loading and unloading the elevator at any point, I have provided a means whereby automobiles may be loaded or unloaded at the bottom of the elevator in an easy, rapid and safe manner, by simply driving the automobile upon one of the platforms 11 and then loading the platform upon a pair of the racks 10.

The loading and unloading mechanism, as illustrated in the drawings, (see Figs. 20 through 23) comprises a pair of trucks 110 and 111 for carrying the platforms 11 into and out of the elevator, a pantograph mechanism 112 for raising or lowering the trucks into or out of engagement with the platform and a cable-operating mechanism 113 for moving the trucks laterally into and out of the elevator.

Each of the trucks 110 and 111 comprises a plurality of wheels 115 mounted upon a plurality of axles 116 which support a central body member, such as an I-beam 117, that may be utilized to carry the platform 11 which is to be moved into or out of the elevator.

The truck wheels 115 are disposed to run in narrow grooved track rails 118 which are laid in three sections 119, 120 and 121. The middle rail section 120 is mounted upon the pantograph structure 112 so that it and the trucks disposed thereon may be raised or lowered under the lowermost platform on the elevator. The end rail sections 119 and 121 are disposed on the floors of the driveways at the sides of the elevator. The rails are embedded in the floors, and therefore, offer little resistance to the movement of other things across them when they are not occupied by the trucks 110 and 111.

The pantograph mechanism 112 comprises four pairs of pantograph arms 123 and 124 that are mounted upon the floor of the foundation 2, by means of hinged joints 125, in such position as to extend upwardly and support the four corners of the pantograph top 126 and which bears the rail section 120.

Any suitable means may be employed for operating the pantograph arms 123 and 124 to raise and lower the pantograph structure, such as an air compresser 128 which supplies compressed air to a storage reservoir 129 for operating a piston 131 in a cylinder 132. The piston 131 is connected to the pantograph arms 123 and 124 by a rod 133, links 134 and cross rods 135 in such manner that it will straighten out the pantograph arms and, therefore, raise the pantograph structure when it is actuated by compressed air.

The admission of compressed air to the cylinder 132 to operate the piston 131 may be controlled through a three-way valve 136 that is connected in the pipe line 130. The valve 136 may be located at any suitable point where it may be reached easily by an attendant.

Ordinarily, the weight of the pantograph structure will be sufficient to move the piston 131 to the right and cause the air to be exhausted from the cylinder 132 when the valve 136 is turned to the "exhaust" position, but a compressed spring 138 is disposed between the piston and the end wall 137 of the cylinder to ensure the movement of the piston to the right when the pantograph structure is to be retracted.

The cable-operating mechanism 113 for moving the trucks 110 and 111 into and out of the elevator comprises a plurality of rotatable cable drums 140 mounted on stationary bearings 141 at the sides of the pantograph structure and a pair of cables 142 and 143 that are disposed on the drums with their ends fastened to the trucks so that the trucks will be hauled in or out in accordance with the direction of rotation of the drums. Secured to, and depending from, each side of the pantograph top 120 is a standard 144 in the lower end of which is rotatably mounted a pulley 145. The pulleys 145 are disposed to bear against the cables 142 and 143 as the trucks 110 and 111 are raised or lowered between the drums 140 and, therefore, serve to take up any slack that may develop in the cables by reason of changes in the vertical position of the trucks.

An electric motor 148 (see Fig. 23) is connected, by a shaft 149, to one pair of the cable drums 140 to provide for rotating the drums to operate the cables 142 and 143. The motor 140 is illustrated as connected to a suitable source of electrical energy represented by the supply conductors L1 and L2. A reversible switch 150 is disposed in the circuit for the motor to enable the attendant to control the operation and direction of rotation of the motor.

The operation of the elevator is as follows:

Assuming that one of the removable platforms 11 has been unloaded from the elevator and is standing on the trucks 110 and 111 in the left-hand driveway (see Fig. 2); that an automobile 151 has been driven upon the platform to be loaded into the elevator and that the attendant has moved the truck-raising switch 150 to one side, then energy will be supplied to the motor 148 which will rotate the cable drums 140 and cause the cables 142 and 143 to haul the trucks 110 and 111, with the automobile 151 thereon, into loading position at the lowermost point of the elevator.

In the loading position, the ends of the platform 11 will be disposed directly above the hook-shaped members 12 on the lower ends of the racks 10 that are lowermost in the elevator. As the trucks 110 and 111, with the platform and the automobile, reach the loading position, the attendant opens the truck-moving switch 150, thereby stopping the motor 148 and preventing the trucks from being hauled beyond the loading point.

When the trucks are in the elevator-loading position, the attendant moves the valve 136 to the right and thereby permits the compressed air in the cylinder 132 to be exhausted through an exhaust port 152. As the compressed air is exhausted from the cylinder 132, the piston 131 moves to the right and thus operates the connecting rod 133 to retract the pantograph arms 123 and 124 from their raised position, thereby lowering the trucks 110 and 111 and the platform 11. As the platform 11 descends, the channel members 53 on each end thereof engage the hook-shaped members 12 on the lower ends of the lowermost racks 10, and the platform comes to rest on the racks. Inasmuch as the ends of the channel members 53 are closed with the blocks 54, the platform 11 will be firmly interlocked with the hook-shaped members 12 and cannot slide therefrom.

Assuming that the attendant, desiring to remove from the elevator an automobile 162 that is located on the fourth cage 9a from the bottom in the left-hand column 4, operates the elevator switch 44 to cause the cage 9a to descend to the lowermost point in the elevator, then energy will be supplied to the elevator motor 37, and the motor will operate the gear trains 38, 39 and 40 to rotate the gear wheels 41. Inasmuch as the gear wheels 41 are firmly mounted on the hubs of the sprocket wheels 33, the sprocket wheels will rotate therewith and, by reason of the fact that their teeth are meshed with the rollers 17 in the racks 10, all the racks in the right-hand column 5 will be raised while all the racks in the left-hand column 4 will be lowered.

Inasmuch as the gear wheels 41 are rotating with the sprocket wheels 33, the forks 74 on the riders 61a will be in engagement with the grooved wheels 75 on the upper ends of the lowermost racks 10a and will, therefore, push the racks 10a to the right (see Fig. 4) along the transfer tracks 27 and 60 until they are raised underneath the racks 10b in the right-hand column.

By reason of the engagement of the roller 77 on the rider 61a with the cam-shaped track 79, as well as the engagement of the track 60 with the grooved wheel 68 on the upper ends of the racks 10a, these racks will arrive under, or catch up with, the racks 10b at a speed that will be in synchronism with the speed of the racks 10b, so that the upper ends of the racks 10a will engage the lower ends of the racks 10b and push them on upwardly without any jolting or jarring as the sprocket wheels 33 continue to rotate.

As the teeth on the sprocket wheels 33 leave the rollers 17 on the racks 10b, the following teeth on the sprocket wheels will engage the rollers 17 on the upper part of the racks 10a and push these racks on up under the racks 10b, thus raising all the racks in the right-hand column 5 of the elevator.

As the rider 61a continues to rotate with the gear wheels 41 and pass the point that is horizontal with the axis of the sprocket wheels 33, the cooperating tracks 60 engage the opposite sides of the rollers 77 and keep the riders 61a in their retracted positions while they are travelling through the upper part of their arcuate path represented by the dotted line 163.

When the gear wheels 41 and the riders 61a start to move, the riders 61 are moving into position to engage the grooved wheels 75 on the upper ends of the racks 10c. Inasmuch as the sprocket wheels 33 are rotating in a counter-clockwise direction with the gear wheels 41, the racks 10c are descending to a point where the grooved wheels 66 on the lower ends thereof enter the curved transfer tracks 27. The continued movement of the sprocket wheels 33 and the gear wheels 41 causes the riders 61 to engage the grooved wheels 75 on the racks 10c. As the racks 10c leave the teeth of the sprocket wheels, further rotation of the gear wheels 41 causes the rollers 77 on the riders 61 to be engaged by the cam-shaped tracks 79, thus moving the riders 61 outwardly as they rotate with the gear wheels and causing the riders to move the racks 10c along the transfer tracks 27 and 60.

By reason of the shape of the tracks 79, the speed of movement of the riders 61 and the racks 10c will increase as the racks descend to the lowermost point in the elevator. As the racks 10c reach the lowermost point on the elevator, the grooved wheels 66 in the track 27 will reach a slightly cut-away portion 164 that is designed to cause the lower part of the racks to come to a rest for an instant, so that the action of the riders 61 on the top part of the racks will cause the racks to be tilted very slightly from the left to the right in preparing to ascend in the column 5. Further rotation of the gear wheels 41 causes the riders 61 to carry the racks 10c up under the racks 10a in the right-hand column 5, as described in connection with the racks 10a.

While the lower transfer mechanism is moving the racks from the left-hand column to the right-hand column, the upper transfer mechanism is moving the racks or cages from the right-hand column to the left-hand column. As the racks 10d in the column 5 (see Fig. 8) are raised and the racks 10e in the column 4 are lowered by the rotation of the sprocket wheels 33, the relative movement of the columns causes rotation of the sprocket wheels 33' which, in turn, rotate the triangular members 41'. The rotation of the triangular members 41' causes the rollers 77 on the riders 61b to engage the cam-shaped tracks 101 which, by reason of their shape, push the riders outwardly and causes them to engage the grooved wheels 66 on the lower ends of the racks 10d as those racks leave the teeth on the sprocket wheels 33'. When the racks 10d leave the sprocket wheels 33', their grooved wheels 68 and 75 engage the rails 98 and 99 of the transfer track 26. At this point, the racks 10d are supported, at their lower ends, by the forks 74 on the riders 61d, and, at the upper ends, by the transfer rails 98 and 99. As the racks in the columns continue to move, the gear wheels 33' are rotated further and thus cause the riders 61b to push racks 10d at an increased speed along the transfer track 26.

By reason of the curvature of the track 26, the racks will lean slightly to the left. However, as they reach the center of the elevator, the lugs 104 on the sides of the racks will engage the rollers 103' on the transfer mechanism and cause the racks to hesitate in their movement. Meanwhile, the riders 61b, which are in contact with the lower parts of the racks, continue their movement, thus causing the racks to tilt slightly to the right to prepare them to descend in the left-hand column 4.

It will be noted that the transfer rails 99 are cut away slightly at their uppermost points 166 to permit the racks to rise slightly so that the lugs 104 may pass over the rollers 103' as the transfer movement of the racks 10d is continued. As the racks in the columns continue their movements, the riders 61b are carried around with the triangular member 41' from the topmost point to a position that is approximately horizontal with the axis of the sprocket wheels. By reason of the decreasing curvature of the cam-shaped tracks 101 acting on the rollers 77 on the riders 61d, the racks 10d will descend from the uppermost point on the transfer-track rails 98 and 99 at a decreasing speed until they engage, and are seated on, the racks in the left-hand column 4.

It is apparent that, by reason of the curvature of the cam-shaped track 101 and the transfer rails 98 and 99, the racks will be transferred from column 5 to column 4 at a speed which increases during the first part of the movement above the speed of the racks in the columns and decreases in speed during the latter half of the movement until they are travelling at the same speed as the racks in the column to which they are being transferred.

By reason of the speed at which the racks are transferred, the topmost cage in the column from which the transfer is being made is quickly pushed upward out of the road of the cage under it and is moved at high speed upwardly, over and down into the column to which it is being transferred, thus getting it quickly out of the way of the next cage to be transferred.

The movement of the cages in a counter-clockwise direction in the circuitous path formed by the column 4, passageway 8, column 5 and the passageway 7 continues with the cages being transferred from the left-hand column to the right-hand column at the bottom of the cage and the upper cages being transferred from the right-hand column to the left-hand column, until the cage 9a bearing the automobile 162 reaches the lowermost point in the elevator. At this point, the attendant opens the elevator motor switch 44 and thereby stops the elevator with the cage 9a at the unloading point.

The attendant then rotates the air valve 136 in a clockwise direction to admit compressed air to the cylinder 132 which, in turn, operates the piston 131 to raise the pantograph structure, with the trucks 110 and 111 thereon, under the elevator cage 9a. As the trucks 110 and 111 reach the end of their upward travel, they engage the movable platform bearing the automobile 162 and lift it above the hook-shaped members 12 in that cage. Thereupon, the attendant moves the truck-moving switch 150 to its closed position, thereby supplying energy to the motor 148 which operates cable drums 140 and causes the cables 142 and 143 to haul the trucks bearing the removable platform and the automobile 162 from within the elevator to a position in the driveway at the left-hand side of the elevator, as shown in Fig. 2. When the automobile 162 reaches the unloading point in the driveway, the attendant opens the truck-moving switch 150 to stop the trucks 110 and 111, whereupon the automobile may be driven from the platform 11.

If it is desired to remove another automobile from the elevator before a car to be loaded thereon appears, the operation just described is reversed, and the removable platform 11 is returned to its position in the elevator and the elevator then operated until the car to be removed is in an unloading position at the bottom of the shaft.

It will be obvious from the drawings and the description thereof that the elevator may be operated equally well in either direction by the use of the reversing switch 44 for the elevator motor and, therefore, that automobiles may be removed from either of the columns 4 and 5 without the necessity of always moving them in one direction in the circuitous path.

Therefore, it will be seen that I have provided an automobile-storage elevator in which the cages may be moved continuously while being supported from the bottom instead of from the top, thereby effecting great economy in the cost of the building construction by reason of the reduction in the size of the structural members required and that I have also provided a mechanism for transferring the upper cages from one column to another that will automatically adjust its operative position with reference to the cages, regardless of any misalignment of the working parts which may be caused by wear or by changes in temperature.

It is also evident that I have provided an automobile-storage elevator that may be employed in such manner as to utilize practically all the available room in a building for storage purposes and of such a sturdy construction that a renewal of its parts will rarely be necessary.

While I have illustrated and described only one specific embodiment of my invention, I realize that it is susceptible of many modifications and I do not desire to be limited to the precise construction illustrated and described except as defined in the appended claims.

I claim as my invention:

1. In an elevator, means defining a pair of adjacent vertical columns interconnected at their respective ends, a plurality of load receptacles in each of said columns and means for supporting all of the receptacles in each column and for moving said receptacles through the path defined by said columns with a continuous movement, said moving means including a lower transfer mechanism operably responsive to actuation of said moving means for transferring the lower receptacles from either column to the other, and an upper transfer mechanism supported by said receptacles and operably responsive to movement of said receptacles for transferring the upper receptacles from either column to the other.

2. In an elevator, a plurality of vertically disposed guideways defining a pair of vertical columns, curved guideways for interconnecting the columns at their lower ends, curved guideways for interconnecting the columns at their upper ends, a plurality of load receptacles in each of said columns and means for causing said receptacles to be guided by said guideways, means for supporting all of the receptacles in each column and for moving said receptacles through the path defined by said guideways with a continuous movement, said moving means including a lower receptacle-actuating mechanism operably responsive to actuation of said moving means for moving the lower receptacles along the lower guideways from one column to the other, and an upper receptacle-actuating mechanism for moving the upper receptacles along the upper curved guideways from one column to the other.

3. In an elevator, a plurality of vertically disposed guideways defining a pair of vertical columns, curved guideways for interconnecting the columns at their lower ends, curved guideways for interconnecting the columns at their upper ends, a plurality of load receptacles in each of said columns, means for causing said receptacles to be guided by said guideways and means for supporting all of the receptacles in each column and for moving said receptacles through the path defined by said guideways with a continuous movement, said moving means including a lower receptacle-actuating mechanism operably responsive to actuation of said moving means for moving the lower receptacles along the lower guideways from one column to the other, and an upper receptacle-actuating mechanism for moving the upper receptacles along the upper curved guideways from one column to the other, said upper actuating mechanism being supported and actuated by the receptacles in said columns.

4. In an elevator, a plurality of vertically disposed guideways defining a pair of vertical columns, curved guideways for interconnecting the columns at their lower ends, curved guideways for interconnecting the columns at their upper ends, a plurality of load receptacles in each of said columns, means for causing said receptacles to be guided by said guideways and means for supporting all of the receptacles in each column and for moving said receptacles through the path defined by said guideways with a continuous movement, said moving means including a lower receptacle-actuating mechanism operably responsive to actuation of said moving means for moving the lower receptacles along the lower guideways from one column to the other, and an upper receptacle-actuating mechanism for moving the upper receptacles along the upper curved guideways from one column to the other, said upper mechanism and said upper curved guideways being supported and operated by the receptacles in said columns.

5. In an elevator, means defining a pair of adjacent vertical columns interconnected at their respective ends, a plurality of pairs of cooperating racks in each of said columns, a platform removably disposed on each pair of cooperating racks and a pair of sprocket wheels for supporting and moving the racks in each column through the lowermost pair of racks in that column.

6. In an elevator, means defining a pair of adjacent vertical culumns interconnected at their respective ends, a plurality of load receptacles in each of said columns supported one upon another, means for simultaneously moving said columns vertically in opposite directions and means for transferring the uppermost receptacle of one column and the lowermost receptacle of the other of said columns to opposite columns comprising a plurality of rotatable members disposed to be rotated by actuation of said moving means, a plurality of riders slidably disposed on said rotatable members and means operably responsive to operation of said rotatable members for causing said riders to engage and move the racks to be transferred.

7. In an elevator, a plurality of guideways arranged to provide a pair of adjacent vertical columns, curved guideways for interconnecting the columns at their lower ends, curved guideways for interconnecting the columns at their upper ends, a plurality of pairs of cooperating racks disposed in each of said columns to be guided by said guideways, a platform disposed on each pair of cooperating racks, a pair of sprocket wheels for supporting and moving the racks in said column, lower transfer mechanism operably responsive to actuation of the sprocket wheels for moving the lowermost racks along the lower curved guideways and upper transfer mechanism supported upon the racks in the columns and operably responsive to movement thereof for moving the upper racks along the upper curved guideways.

8. In an elevator, a plurality of guideways arranged to provide a pair of adjacent vertical columns, curved guideways for interconnecting the columns at their lower ends, curved guideways for interconnecting the columns at their upper ends, a plurality of pairs of cooperating racks disposed in each of said columns to be guided by said guideways, a platform disposed on each pair of cooperating racks, means for supporting and moving the racks in each column, a lower transfer mechanism comprising a plurality of riders slidably disposed on said moving means, means operably responsive to operation of said moving means for causing said riders to move outwardly on said moving means to engage the racks and move them along the lower curved guideways, an upper transfer mechanism comprising a pair of rotatable members supported by and operably responsive to movement of the racks in the columns, a plurality of riders slidably disposed on said rotatable members and means operably responsive to movement of said rotatable members for causing said last named riders to move outwardly and thereby engage the racks and move them along the upper curved guideways.

9. In an elevator, a plurality of guideways arranged to provide a pair of adjacent vertical columns, curved guideways for interconnecting the columns at their lower ends, curved guideways for interconnecting the columns at their upper ends, a plurality of pairs of cooperating racks disposed in each of said columns to be guided by said guideways, a platform disposed on each pair of cooperating racks, means for supporting and moving the racks in each column, a lower transfer mechanism comprising a plurality of riders slidably disposed on said moving means, means operably responsive to operation of said moving means for causing said riders to move outwardly on said moving means to engage the racks and move them along the lower curved guideways, an upper transfer mechanism comprising a pair of rotatable members supported by, and operably responsive to movement of the racks in the columns, a plurality of riders slidably disposed on said rotatable members and means operably responsive to movement of said rotatable members for causing said last named riders to move outwardly to thereby engage the racks and move them along the upper curved guideways, said rider-moving means being so disposed as to cause the racks to move along the curved guideways at an increased speed.

10. In an elevator, means defining a pair of adjacent vertical columns interconnected at their respective ends, a plurality of pairs of cooperating racks in each of said columns, means for supporting and circuitously moving said racks in either direction through the path defined by said columns with a continuous movement, a plurality of load-bearing platforms, one for each cooperating pair of racks, and interlocking members for removably supporting the platforms on the racks.

11. In an elevator, means defining a pair of adjacent vertical columns interconnected at their respective ends, a plurality of pairs of cooperating racks in each of said columns, means for supporting and circuitously moving said racks in either direction through the path defined by said columns with a continuous movement, a plurality of load-bearing platforms, one for each cooperating pair of racks, interlocking members for removably supporting the platforms on the racks, means for disengaging the interlocking members by raising the platforms and means for moving the disengaged platforms laterally from the elevator.

12. In an elevator, a plurality of vertically disposed guideways arranged to provide a pair of adjacent vertical columns, a plurality of pairs of cooperating racks disposed in each of said columns, a load-bearing platform for each pair of cooperating racks, curved guideways for interconnecting the respective ends of said columns, said curved guideways being disposed in planes parallel to the planes of the vertical guideways, means for supporting and circuitously moving said racks in either direction through the path defined by said guideways, means disposed upon the racks for retaining them in position while they are disposed in the vertical guideways and additional means disposed on the racks for retaining them in position in the curved guideway while they are being transferred from one column to the other.

13. In an elevator, a plurality of vertically disposed guideways defining a pair of vertical columns, curved guideways for interconnecting the columns at their lower ends, curved guideways for interconnecting the columns at their upper ends, a plurality of load receptacles in each of said columns and means for causing said receptacles to be guided by said guideways, means for supporting all of the receptacles in each column and for moving said receptacles through the path defined by said guideways with a continuous movement, said moving means including a lower receptacle-actuating mechanism operably responsive to actuation of said moving means for moving the lower receptacles along the lower guideways from one column to the other, and an upper receptacle-actuating mechanism for moving the upper receptacles along the upper curved guideways from one column to the other, and cooperating members disposed on the racks and the curved guideways for causing the racks to be tilted from one side to the other as they pass the lowest point in the lower curved guideways and the highest point in the upper curved guideways.

14. In an elevator, means defining a pair of adjacent vertical columns interconnected at their respective ends, a unitary conveyor structure comprising a plurality of load receptacles in each of said columns and supported one upon another, an upper guiding and transfer mechanism for moving said receptacles from either column to the other, and a lower guiding and transfer mechanism for moving said receptacles from either column to the other; a foundation at the bottom of said columns defining means for effecting the entire vertical supporting force for the whole of said unitary conveyor structure independently of the said means defining the vertical columns.

15. In an elevator, means defining a pair of adjacent vertical columns interconnected at their respective ends, a unitary conveyor structure comprising a plurality of load receptacles in each of said columns and supported one upon another, an upper guiding and transfer mechanism for moving said receptacles from either column to the other, and a lower guiding and transfer mechanism for moving said receptacles from either column to the other; a foundation at the bottom of said column defining means for effecting the entire vertical supporting force for the whole of said unitary conveyor structure independently of the said column defining means; and means on said column defining means for slidably engaging said unitary conveyor structure to give lateral support thereto and allow a vertical movement thereof.

16. In an elevator, means defining a pair of adjacent vertical columns interconnected at their respective ends, a unitary conveyor structure comprising a plurality of load receptacles in each of said columns and supported one upon another, an upper guiding and transfer mechanism for moving said receptacles from either column to the other, and a lower guiding and transfer mechanism for moving said receptacles from either column to the other; a foundation at the bottom of said column defining means for effecting the entire vertical supporting force for the whole of said unitary conveyor structure independently of the said column defining means; and means on said column defining means for slidably engaging the said upper guiding and transfer mechanism of said unitary conveyor structure to give lateral support thereto and allow vertical movement thereof.

17. In an elevator, means defining a pair of adjacent vertical columns interconnected at their respective ends, a plurality of load receptacles in each of said columns and means for supporting all of the receptacles in each column and for moving said receptacles through the path defined by said columns with a continuous movement, said moving means including a lower transfer mechanism operably responsive to actuation of said moving means for transferring the lower receptacles from either column to the other, and an upper transfer mechanism operably responsive to movement of said receptacles for transferring the upper receptacles from either column to the other.

In testimony whereof, I have hereunto subscribed my name this 24th day of August, 1929.

CHARLES F. GODDARD.